United States Patent Office 2,699,783
Patented Jan. 18, 1955

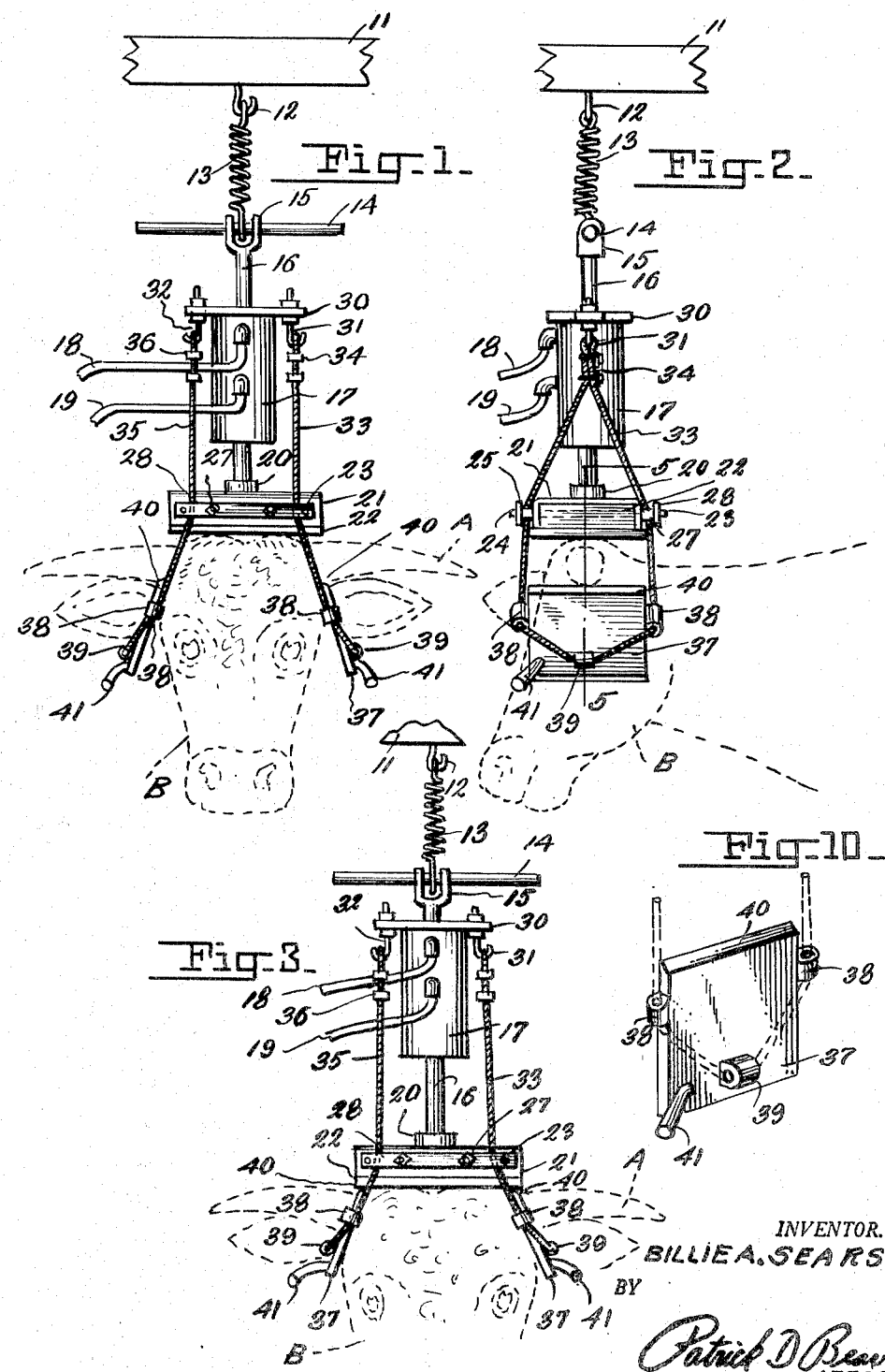

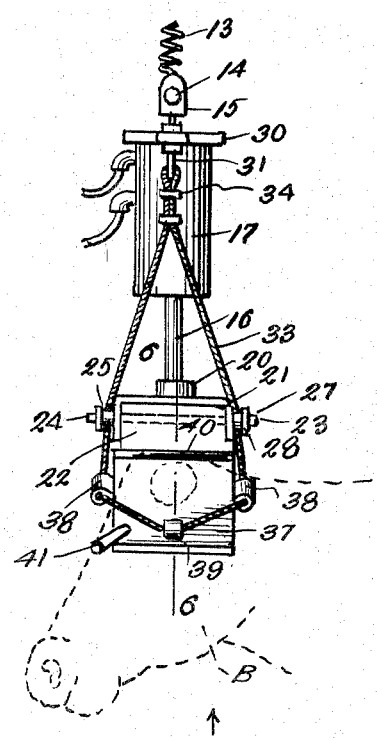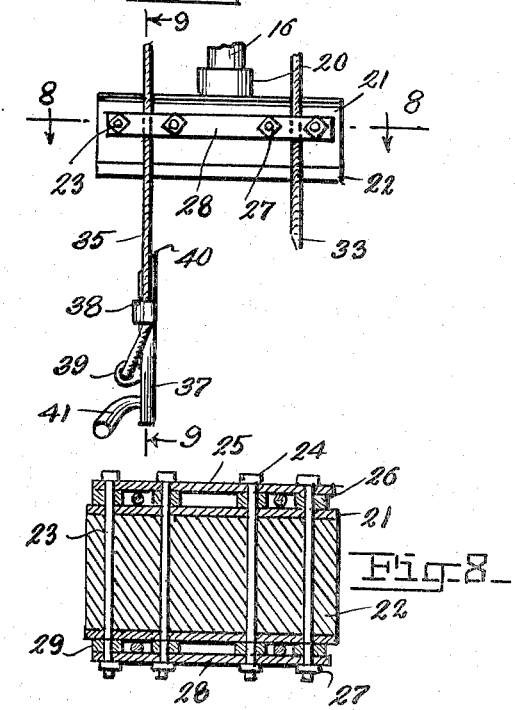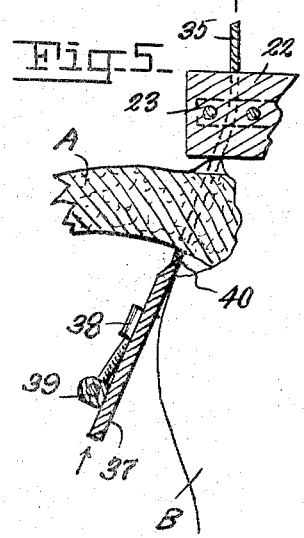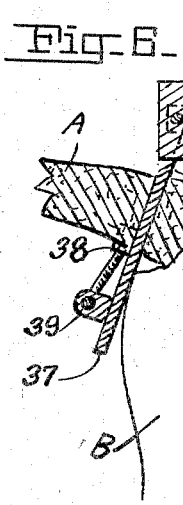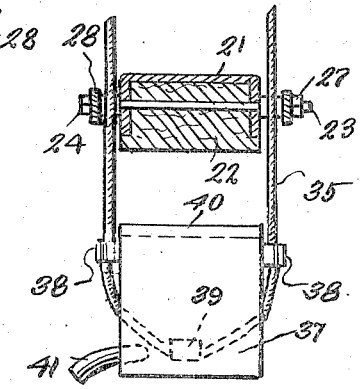

2,699,783

DEHORNER

Billie Atkins Sears, Lisco, Nebr.

Application February 26, 1954, Serial No. 412,972

7 Claims. (Cl. 128—305)

This invention relates to improvements in de-horners and more particularly to a hydraulically operated dehorner for clipping the horns of cattle.

The methods and de-horners in use at the present time are slow in operation, requiring tedious work to accomplish the clipping of the horns of cattle. The de-horners used at the present time require the clipping of one horn at a time and necessitates a great deal of strength on the part of the operator to complete the job.

An object of the present invention is, therefore, to provide a de-horner which will simultaneously clip both horns of the cattle without a great deal of effort on the part of the operator.

Another object of the present invention is to provide a de-horner which in large herds of cattle will greatly decrease the time required to clip the horns from the cattle.

The present invention is so constructed that it can be used with or without a cattle chute. The only requirement that is necessary is to have some operating means for the hydraulic cylinder that operates the ram to which the clipping knives are attached.

The de-horner of the present invention will be attached to the gate of the chute and as the cattle enter the chute the de-horner will be engaged with the horns of the cattle and operated.

The de-horner of the present invention is fast and effortless in operation. It is also humane as it does not require the time that is usually consumed in manually clipping the horns of cattle.

With the above and other objects and advantages in view the invention consists of the novel details of construction, arrangement and combination of parts more fully hereinafter described, claimed and illustrated in the accompanying drawings in which:

Fig. 1 is an elevational front view of the embodiment of the invention in position on the head of a cow, prior to the clipping of the horns of the cow;

Fig. 2 is an elevational side view of Fig. 1;

Fig. 3 is an elevational front view similar to Fig. 1, except that the horns shown in dotted lines have been clipped from the head of the cow;

Fig. 4 is an elevational side view of Fig. 3;

Fig. 5 is a fragmentary vertical sectional view on the line 5—5 of Fig. 2;

Fig. 6 is a fragmentary vertical sectional view on the line 6—6 of Fig. 4;

Fig. 7 is a fragmentary elevational side view of the cutter butt block;

Fig. 8 is a longitudinal sectional view on the line 8—8 of Fig. 7;

Fig. 9 is a vertical sectional view on the line 9—9 of Fig. 7; and

Fig. 10 is a perspective view of one of the cutter knives or blades.

Referring more in detail to the drawings wherein like parts are designated by like reference numerals, the numeral 11 is used to designate a suitable support for the de-horner embodying the invention. The support 11 may be the gate of the cattle chute or may be any other support that will enable the de-horner to be operated as will be later described.

Firmly embedded in the support 11 is a hook 12 which receives one end of a coil spring 13 whereby the de-horner of the present invention is resiliently supported.

The opposite end of the spring 13 receives a tubular handle 14 of the de-horner on which is mounted a yoke 15 of a ram 16 of a two-way hydraulic cylinder 17. The hydraulic cylinder being equipped with the usual inlet and outlet conduits 18 and 19 that are connected to some suitable source of supply for operating the cylinder which in most instances is a pump operated at some remote location with regard to the de-horner.

The lower end of the ram 16 is provided with an enlarged head 20 which is rigidly secured to a U-shaped support 21. Mounted in the support 21 and fitted thereto is a hardwood cutter butt block 22. Extending transversely of the support 21 and passing through the block 22 are a plurality of elongated bolts 23. Each bolt is provided with a head 24 and mounted on the bolts 23 in contact with the heads thereon is an elongated plate 25. A spacer 26 on each of the bolts 23 spaces the plate from the support 21 for a purpose to be later described. The opposite end of each bolt is threaded and a nut 27 on each bolt engages an elongated plate 28 which is identical with the plate 25, the plate 28 being similarly spaced from the support 21 by spacers 29.

Rigidly secured to the upper end of the cylinder 17 is a supporting plate 30 in which are fastened two diametrically opposed adjustable hook members 31 and 32 respectively. The opposite ends of a steel cable 33 are trained over the hook member 31 and the ends of the cable are retained in fixed relation to each other by means of a clamp 34. Similarly the opposite ends of a steel cable 35 are trained over the hook member 32 and the ends of the cable are retained in fixed relation to each other by means of clamp 36.

Each cable thus provides a loop and the loops of the cables extend downwardly and pass through the spaces provided by the spacers 26 and 29. The loops formed by the cables passing on opposite sides of the support 21 so that they extend below the support in opposed relation to each other.

A cutter knife or blade 37, as shown in Fig. 10, is mounted on each loop of the cables, as shown in Figs. 1 and 3, and each side edge of the knife is provided with a tubular guide 38, a similar tubular guide 39 being provided on the outer face of the knife adjacent to and centrally of the butt end of the knife. The knife 37 is so supported on the loops of the cable that a cutting edge 40 thereof is uppermost for engagement with the horns A of the cow B. A short handle 41 is also provided on the outer face of the knife 37. The handle 41 extends in a direction toward the front of the cow B so that the operator of the de-horner may grasp each handle to control the clipping of the horns of the cow.

When the cow is placed in the chute it is usually held in such a position that its head will extend over the gate of the chute. The de-horner embodying the invention is so supported on the gate that the cow's head will come into position directly below the de-horner, as shown in Fig. 1.

The spring 13 will permit the de-horner to be moved to permit the loops, formed by the cables, to be slipped over the horns A of the cow so that the knives 37 by reason of the loops of the cables will normally lie in the position shown in Fig. 1. The knives are adjusted by means of the handles 41. After being properly positioned the operator of the pump controlling the hydraulic cylinder 17 is notified and the pump is operated to extend the ram 16. The knives will then clip the horns A from the cow, as shown in Fig. 3. The butt block 22 engages the head of the cow as the knives move upwardly to clip the horns of the cow and engages the cutting edge 40 of the knives as the clipping is completed.

There has thus been provided a de-horner that will accomplish the clipping of the horns of cattle in an efficient and humane manner and it is believed that the operation of the de-horner will be apparent to those skilled in the art.

It is also to be understood that changes in the minor details of construction and operation of the invention may be resorted to provided they fall within the spirit of the invention and the scope of the appended claims.

Having thus described the invention what is claimed as new and desired to be secured by Letters Patent is:

1. A de-horner for cattle comprising a hydraulically operated cylinder having a ram, means on said ram for engaging the head of a cow to be de-horned and means connected to said cylinder for supporting knives to simultaneously clip the horns of the cow.

2. A de-horner as in claim 1, wherein means is connected to said ram for resiliently supporting the de-horner.

3. A de-horner as in claim 1, wherein the end of the ram remote from the means for engaging the head of the cow is provided with a yoke and a handle for positioning the de-horner is mounted in said yoke.

4. A de-horner as in claim 1, wherein the means connected to said cylinder for supporting said knives comprises a pair of cables and said knives are provided with tubular guides for receiving said cables.

5. A de-horner for cattle comprising a hydraulically operated cylinder having a ram, a yoke on one end of said ram, a handle in said yoke for positioning said de-horner, means connected to said handle for resiliently supporting said de-horner, a pair of cables connected to said cylinder, and a pair of knives carried by said cables for engaging and clipping the horns of cattle.

6. A de-horner as in claim 5, wherein a butt block for said knives is secured to the opposite end of said ram.

7. A de-horner as in claim 5, wherein said knives are provided with tubular guides for engaging said cables, a handle for properly positioning the knives in relation to the horns of cattle.

No references cited.